United States Patent
Chue et al.

(10) Patent No.: US 7,068,461 B1
(45) Date of Patent: Jun. 27, 2006

(54) SERVO WRITING A DISK DRIVE BY OVERWRITING A HARMONIC FREQUENCY FILL PATTERN IN THE SERVO BURST AREA

(75) Inventors: Jack M. Chue, Los Altos, CA (US); Siri S. Weerasooriya, Campbell, CA (US); Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/998,978

(22) Filed: Nov. 29, 2004

(51) Int. Cl.
*G11B 21/02* (2006.01)
(52) U.S. Cl. ...................... 360/75; 360/77.08
(58) Field of Classification Search ...................... None
See application file for complete search history.

(56) References Cited

U.S. PATENT DOCUMENTS

| | | | |
|---|---|---|---|
| 5,311,376 A * | 5/1994 | Joan et al. ............... 360/51 |
| 5,343,340 A * | 8/1994 | Boutaghou et al. ...... 360/77.08 |
| 5,786,957 A | 7/1998 | Inoue et al. |
| 6,025,970 A * | 2/2000 | Cheung ............... 360/77.08 |
| 6,057,977 A * | 5/2000 | Cunningham ......... 360/77.08 |
| 6,754,025 B1 | 6/2004 | Shepherd et al. |
| 6,785,085 B1 | 8/2004 | Guzik et al. |
| 2002/0057509 A1 | 5/2002 | Nishida et al. |
| 2003/0026016 A1 | 2/2003 | Heydari et al. |
| 2003/0048562 A1 | 3/2003 | Heydari et al. |

\* cited by examiner

*Primary Examiner*—K. Wong
(74) *Attorney, Agent, or Firm*—Howard H. Sheerin, Esq.; Jonathan E. Prejean, Esq.

(57) ABSTRACT

A disk drive is disclosed comprising a disk having a plurality of servo bursts written using perpendicular magnetic recording, wherein each servo burst is written at a servo burst frequency. A fill pattern is written between the servo bursts using perpendicular magnetic recording at a frequency substantially equal to an even harmonic of the servo burst frequency, and a phase shift occurs at the transition between the servo burst and the fill pattern. A head is actuated over the disk, and a sampling device samples a read signal emanating from the head to generate a sequence of read signal sample values. Control circuitry demodulates the servo bursts from the sequence of read signal sample values by computing a single-point Discrete Fourier Transform (DFT) at the servo burst frequency.

5 Claims, 6 Drawing Sheets

US 7,068,461 B1

SERVO WRITING A DISK DRIVE BY OVERWRITING A HARMONIC FREQUENCY FILL PATTERN IN THE SERVO BURST AREA

BACKGROUND OF THE INVENTION

1. Field of the Invention

The present invention relates to disk drives. In particular, the present invention relates to servo writing a disk drive by overwriting a harmonic frequency fill pattern in the servo burst area.

2. Description of the Prior Art

FIG. 1 is a prior art recording format showing a plurality of embedded servo sectors $2_0$–$2_N$ recorded on the disk 4 of a disk drive which define a plurality of radially-spaced, concentric data tracks 6. Each data track 6 is partitioned into a plurality of data sectors wherein the servo sectors $2_0$–$2_N$ are considered "embedded" in the data sectors. Each servo sector (e.g., servo sector $2_4$) comprises a preamble 8 for synchronizing gain control and timing recovery, a sync mark 10 for synchronizing to a servo data field 12 comprising coarse head positioning information such as a Gray coded track addresses for use during seeking, and servo bursts 14 which provide fine head positioning information for use during tracking. In a "headerless" format, the servo data field 12 also includes information identifying the data sectors between the servo sectors.

The servo sectors $2_0$–$2_N$ may be written to the disk 4 using the head 16 internal to the disk drive, for example, using an external servo writer or a self-servo writing technique. The head 16 is attached to a distal end of an actuator arm 18, which is rotated about a pivot 20 in order to position the head 16 radially over the disk 4 while writing the servo sectors $2_0$–$2_N$. The servo sectors $2_0$–$2_N$ form arcuate servo wedges extending from the outer diameter to the inner diameter of the disk 4. Alternatively, the servo sectors $2_0$–$2_N$ may be written to the disk 4 by a media writer employing a linear actuator such that the servo wedges are substantially linear, wherein the disk 4 is inserted into the disk drive after servo writing by the media writer.

During a self-servo writing operation, as well as during normal operation of the disk drive, the actuator arm 18 is rotated about the pivot 20 by a rotary actuator. The rotary actuator comprises a voice coil having a first leg 22A and a second leg 22B coupled to the end of the actuator arm 18. When the voice coil is energized with current, the resulting magnetic flux interacts with the magnetic flux of permanent magnets (not shown) to create a torque that rotates the actuator arm 18 about the pivot 20.

In conventional longitudinal magnetic recording the area between the servo bursts 14 is typically DC erased when servo writing the servo sectors $2_0$–$2_N$. However, DC erasing the area between the servo bursts 14 adversely affects the reproduction signal when using more recent perpendicular magnetic recording techniques. A DC erased area induces a DC offset in the read signal as well as an inter-track interference which degrades the position error signal (PES) generated from reading the servo bursts.

U.S. Patent Application No. 2002/0057509 discloses a technique for servo writing a disk drive by writing an AC signal in the area between the servo bursts at a frequency higher than the servo burst frequency. The servo bursts and AC signal are written during each revolution of the disk using a well known "trimming" technique. The frequency of the write clock is adjusted on-the-fly such that there is essentially no phase shift between the servo burst signal and AC signal. However, this technique may not be suitable to servo write the servo bursts if the well known trimming technique is not used. That is, it may be desirable to write servo bursts of a current servo track without trimming the servo bursts of a previously written servo track.

There is, therefore, a need to servo write a disk drive using perpendicular magnetic recording without trimming the servo bursts.

SUMMARY OF THE INVENTION

The present invention may be regarded as a disk drive comprising a disk having a plurality of tracks. Each track comprises a plurality of data sectors and a plurality of servo sectors, wherein each servo sector comprises a plurality of servo bursts written using perpendicular magnetic recording, and each servo burst is written at a servo burst frequency. A fill pattern is written between the servo bursts using perpendicular magnetic recording at a frequency substantially equal to an even harmonic of the servo burst frequency, and a phase shift occurs in a read signal at the transition between the servo burst and the fill pattern. A head is actuated over the disk for generating the read signal, and a sampling device samples the read signal to generate a sequence of read signal sample values. Control circuitry demodulates the servo bursts from the sequence of read signal sample values by computing a single-point Discrete Fourier Transform (DFT) at the servo burst frequency.

In one embodiment, the servo bursts are written over the fill pattern.

In another embodiment, the control circuitry computes the single-point DFT by summing four of the read signal sample values multiplied by respective cosine coefficients $\{+1, +1, -1, -1\}$ to generate a cosine term, summing the four read signal sample values multiplied by respective sine coefficients $\{+1, -1, -1, +1\}$ to generate a sine term, summing a plurality of the cosine terms into a summed cosine term denoted $\Sigma\cos$, summing a plurality of the sine terms into a summed sine term denoted $\Sigma\sin$, and computing the square root of $((\Sigma\cos)^2+(\Sigma\sin)^2)$.

The present invention may also be regarded as a method of servo writing servo sectors onto the disk of a disk drive, the disk drive comprising the disk, and a head actuated over the disk. A fill pattern is written at a first frequency in a servo burst area of a servo sector using perpendicular magnetic recording. A plurality of servo bursts are then written over the fill pattern at a servo burst frequency using perpendicular magnetic recording, wherein the first frequency is substantially equal to an even harmonic of the servo burst frequency.

DESCRIPTION OF THE PREFERRED EMBODIMENTS

Figure 1:
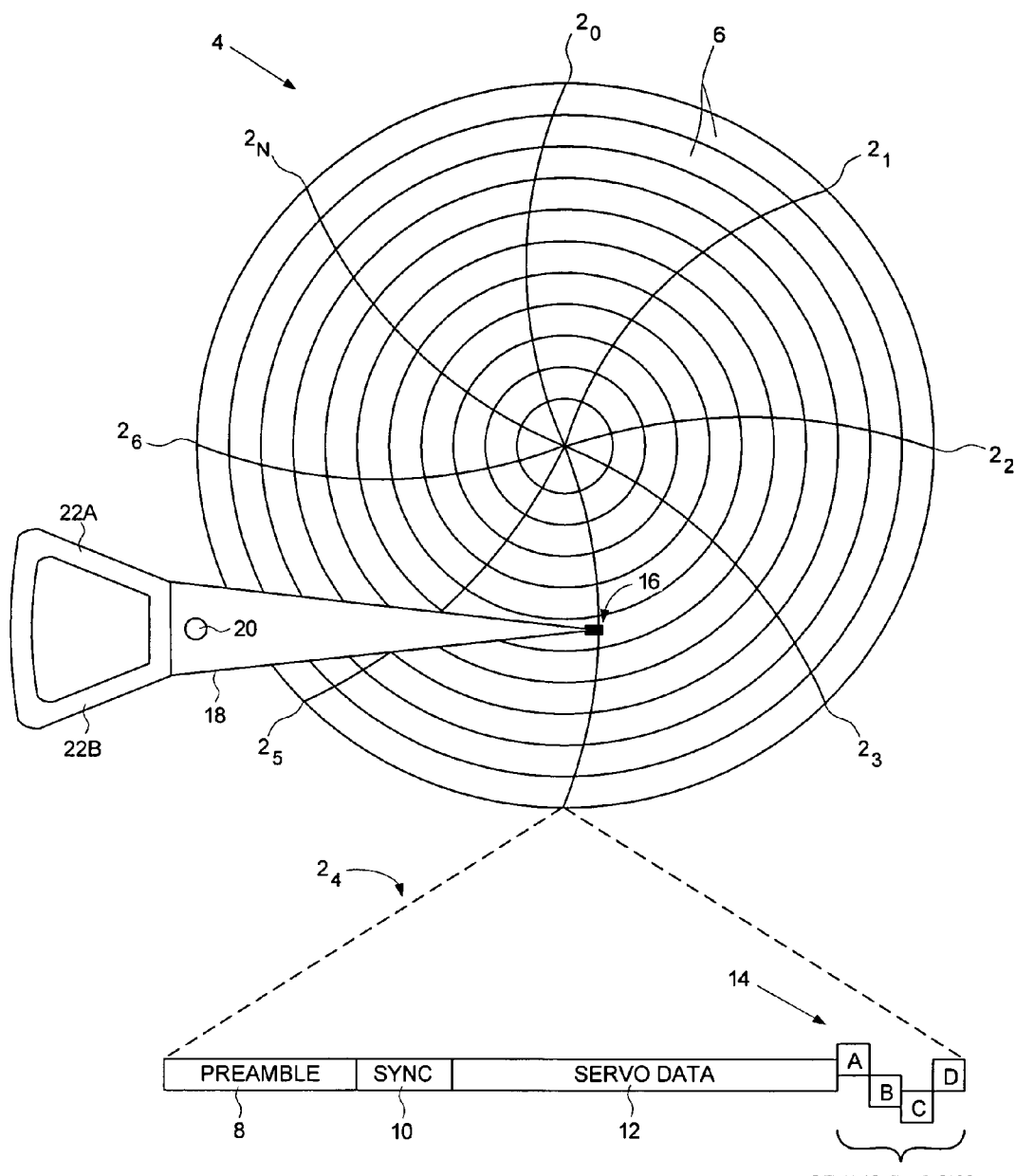
FIG. 1 shows a prior art disk drive employing servo sectors with a DC erase area between the servo bursts.
Figure 2A:
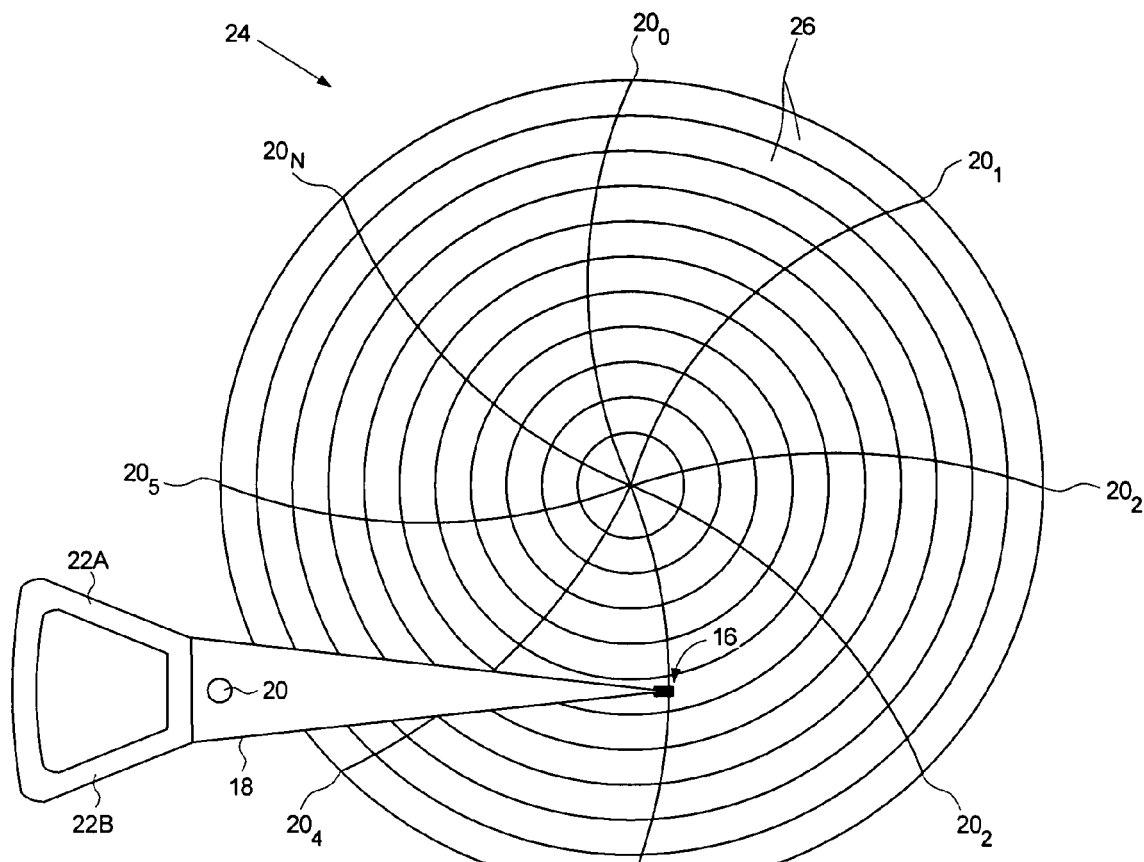
FIGS. 2A–2B show a disk drive according to an embodiment of the present invention wherein a fill pattern is written between the servo bursts at an even harmonic of the servo burst frequency, wherein a phase shift occurs at the transition between the servo burst and the fill pattern.
Figure 2B:
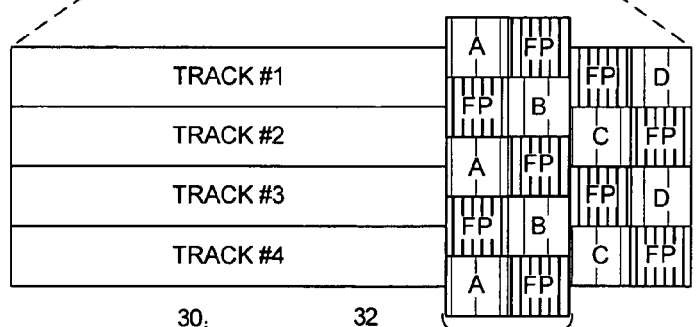
Figure 2B:

FIG. 2A shows a disk drive according to an embodiment of the present invention comprising a disk 24 having a plurality of tracks 26. Each track 26 comprises a plurality of data sectors and a plurality of servo sectors $28_0$–$28_N$, wherein each servo sector $28_i$ comprises a plurality of servo bursts 30 written using perpendicular magnetic recording, and each servo burst $30_i$ is written at a servo burst frequency (FIG. 2B). A fill pattern 32 is written between the servo bursts using perpendicular magnetic recording at a frequency substantially equal to an even harmonic of the servo burst frequency, and a phase shift occurs in a read signal 34 at the transition between the servo burst and the fill pattern (FIG. 2B). A head 16 is actuated over the disk 24 for generating the read signal 34, and a sampling device 36 (FIG. 5) samples the read signal 34 to generate a sequence of read signal sample values 38. Control circuitry demodulates the servo bursts 30 from the sequence of read signal sample values 38 by computing a single-point Discrete Fourier Transform (DFT) 40 at the servo burst frequency.

Any suitable servo pattern may be employed in the embodiment of the present invention, and in the embodiment shown in FIG. 2A, the well known half-track quadrature servo burst pattern is employed comprising A, B, C, and D servo bursts written at a spacing equal to half a data track width. A position error signal (PES) used to maintain the head 16 over the centerline of a target data track is generated by demodulating the servo bursts and comparing the amplitudes of the resulting servo burst signals.

Figure 3A:
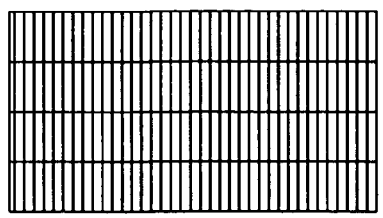
FIGS. 3A–3G show an embodiment of the present invention wherein the fill pattern is first written in the servo burst area, and then the servo burst are written over the fill pattern.
Figure 3B:
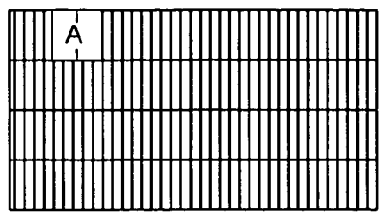
Figure 3C:
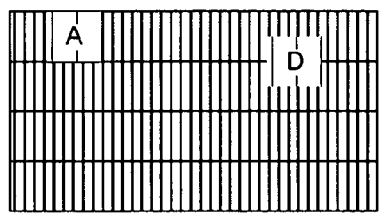
Figure 3D:
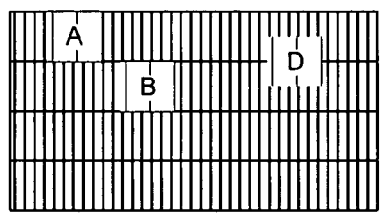
Figure 3E:
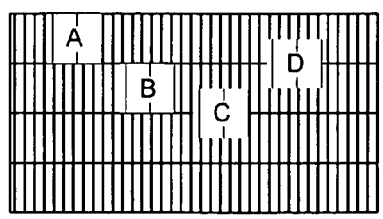
Figure 3F:
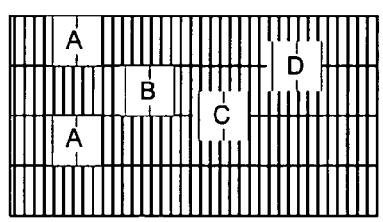
Figure 3G:
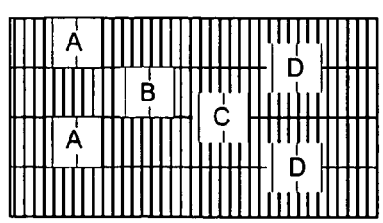
Figure 4:
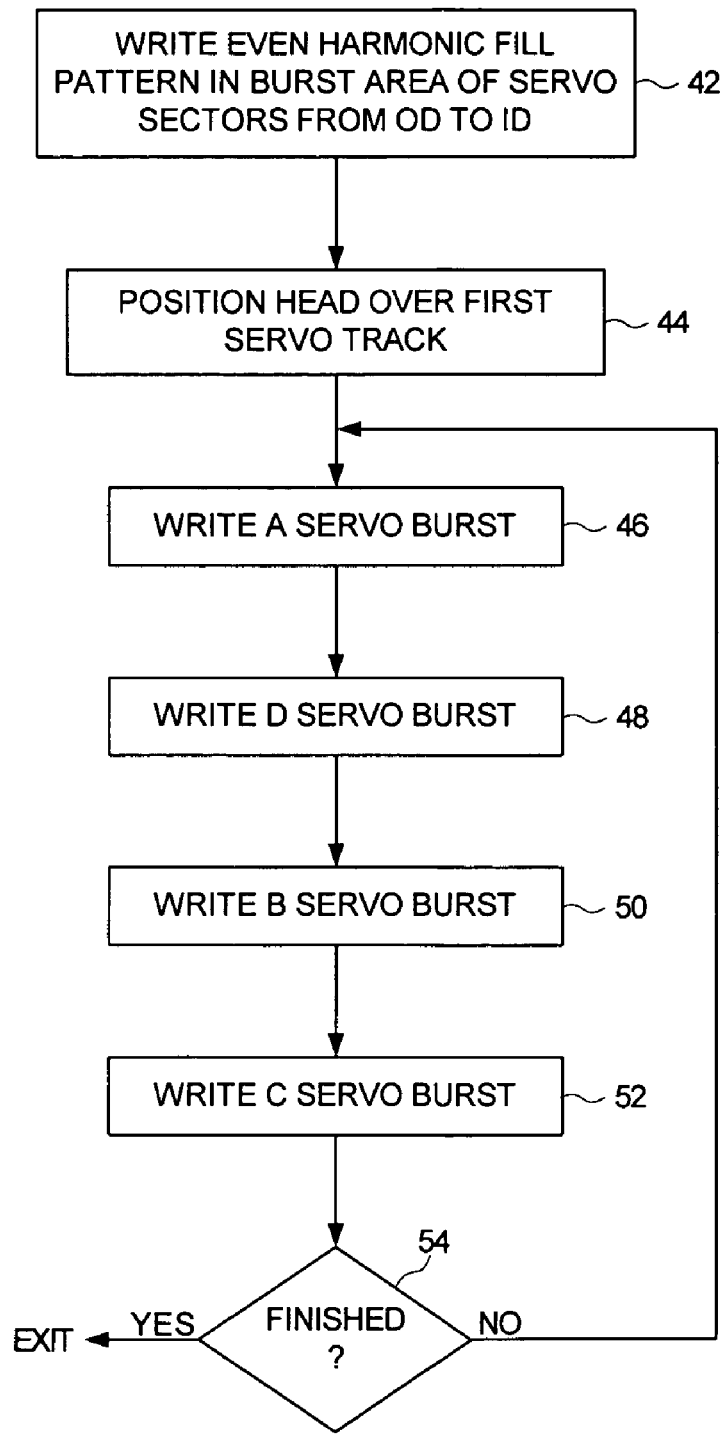
FIG. 4 shows a flow diagram according to an embodiment of the present invention for overwriting a fill pattern with servo bursts.

Recording a fill pattern between the servo bursts at an even harmonic of the servo burst frequency and demodulating the servo bursts using a single-point DFT enables the servo bursts to be written without using the conventional trimming technique. This embodiment is illustrated in FIGS. 3A–3G with reference to the flow diagram of FIG. 4 wherein at step 42 a fill pattern is first written in the servo burst area of each servo sector (FIG. 3A). At step 44 the head 16 is positioned over the first servo track, and during each revolution of the disk a servo burst is written over the fill pattern without trimming a previously written servo burst. At step 46 servo burst A is written during a first revolution of the disk along a first servo track (FIG. 3B). At step 48 servo burst D is written during the next revolution of the disk along a second servo track (FIG. 3C) without trimming servo burst A written in the previous revolution. At step 50, servo burst B is written during the next revolution of the disk (FIG. 3D) without trimming servo burst D, and at step 52, servo burst C is written during the next revolution of the disk (FIG. 3E) without trimming servo burst B. This process is repeated at step 54 until the entire disk is servo written.

In the embodiment shown in FIGS. 3A–3G, the width of the head 16 equals the width of a data track such that the width of each servo burst equals the width of a data track. In another embodiment, the width of the head 16 is less than a data track and the corresponding width of each servo burst is less than the width of a data track.

Overwriting the fill pattern with servo bursts results in a phase shift at the transition between the servo burst and the fill pattern as illustrated in FIG. 2B. However, writing the fill pattern at an even harmonic of the servo burst frequency and demodulating the servo bursts using a single-point DFT effectively filters out the contribution of the fill pattern from the resulting servo burst signal even in the presence of the phase shift.

Figure 5:
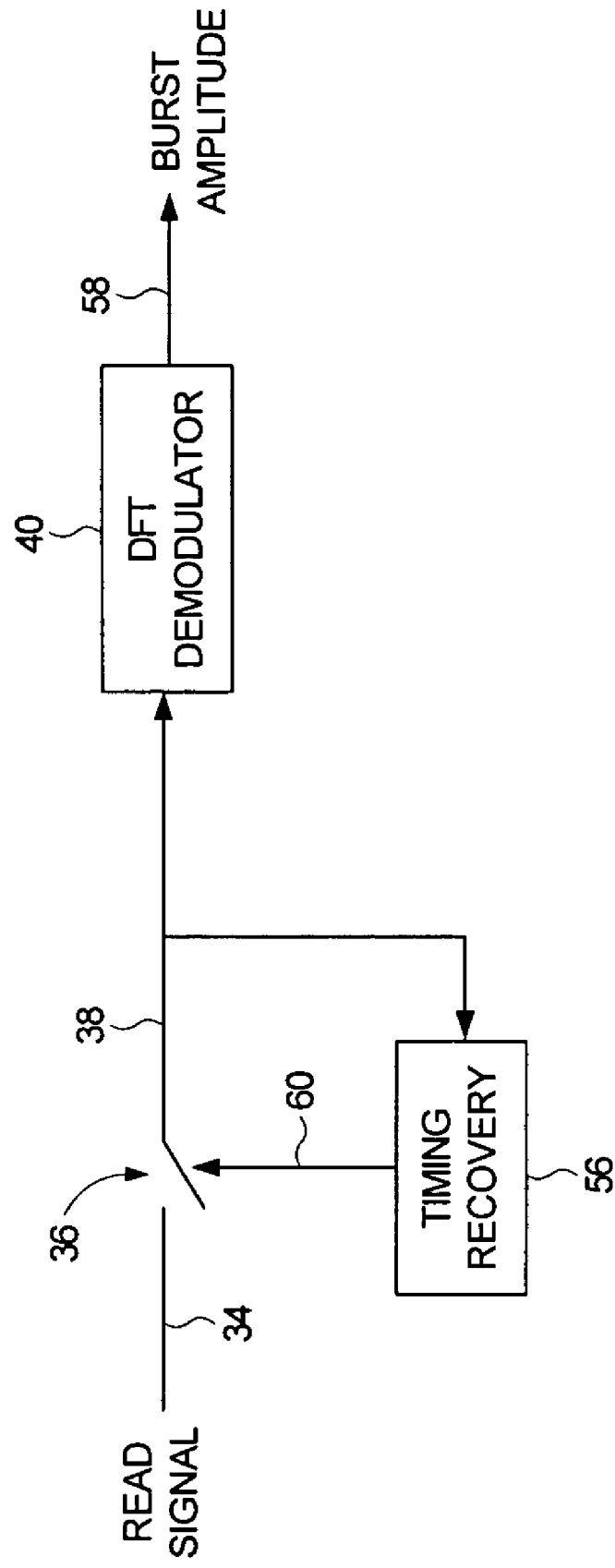
FIG. 5 shows an embodiment of the present invention wherein the servo bursts are demodulated by computing a single-point DFT from read signal sample values.

In the embodiment of FIG. 5, a timing recovery circuit 56 is used to sample 36 the read signal 34 synchronous to the baud rate of the recorded data, including the servo bursts, so as to generate synchronous read signal sample values 38. The single-point DFT demodulator 40 processes the synchronous read signal sample values 38 to generate a servo burst signal 58 representing an amplitude of each servo burst. The timing recovery circuit 56 may employ any suitable circuitry for synchronizing the sampling device 36 to the baud rate, such as a phase-locked loop (PLL) for generating a sampling clock 60 synchronous to the baud rate. In an alternative embodiment, the read signal 34 is sampled 36 asynchronously and the synchronous read signal sample values 38 are generated using a suitable interpolation filter (interpolated timing recovery). In one embodiment, the read signal sample values 38 are synchronized in both frequency and phase when demodulating the servo bursts, and in an alternative embodiment, the read signal sample values 38 are synchronized only in frequency.

The single-point DFT demodulator 40 may also be implemented according to any suitable algorithm using any suitable circuitry. In one embodiment, the single-point DFT is computed by summing four of the read signal sample values multiplied by respective cosine coefficients {+1, +1, −1, −1} to generate a cosine term, summing the four read signal sample values multiplied by respective sine coefficients {+1, −1, −1, +1} to generate a sine term, summing a plurality of the cosine terms into a summed cosine term denoted Σcos, summing a plurality of the sine terms into a summed sine term denoted Σsin, and computing the square root of $((\Sigma\cos)^2 + (\Sigma\sin)^2)$.

Figure 6:
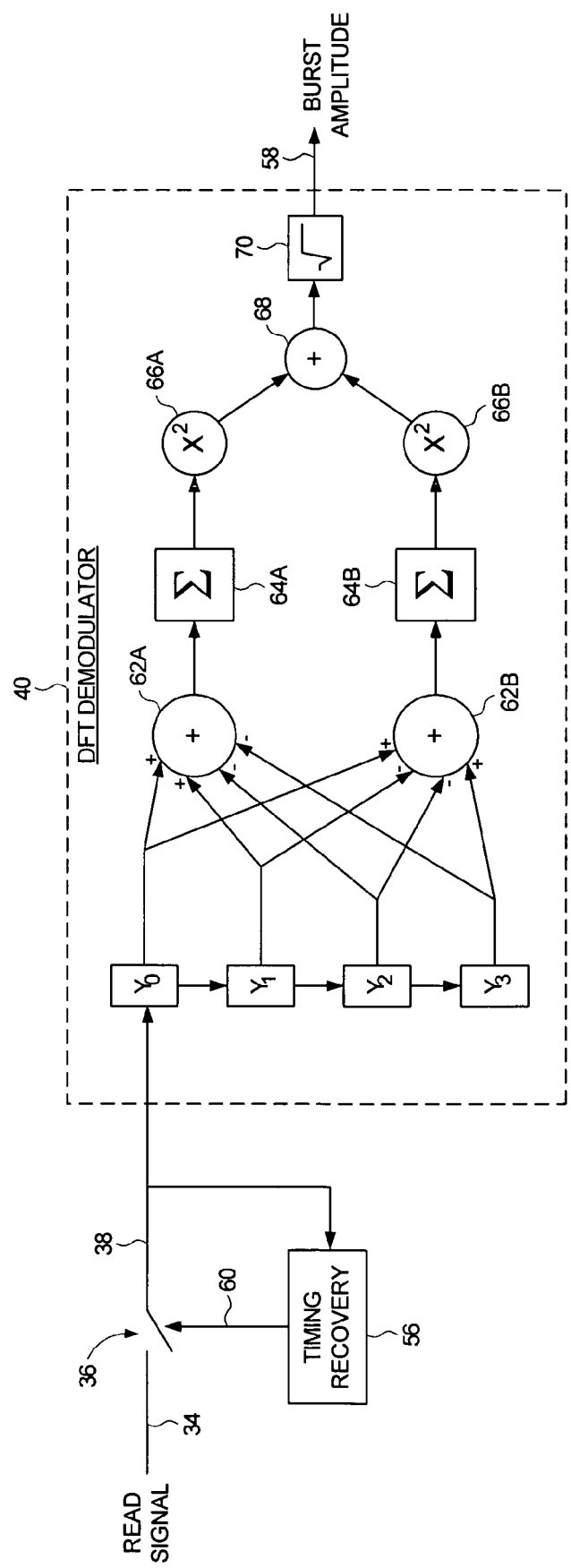
FIG. 6 shows an embodiment for a single-point DFT demodulator.

FIG. 6 shows suitable circuitry for implementing this embodiment wherein the read signal sample values 38 are shifted into a shift register comprising registers $Y_0$–$Y_3$ for storing four consecutive read signal sample values. At each sample clock 60 period, the read signal sample values 38 are shifted so that $Y_0$=new sample value, $Y_1=Y_0$, $Y_2=Y_1$, and $Y_3=Y_2$. A first summing circuit 62A sums the four read signal sample values $Y_0$–$Y_3$ multiplied by respective cosine coefficients {+1, +1, −1, −1} to generate a cosine term, and a second summing circuit 62B sums the four read signal sample values $Y_0$–$Y_3$ multiplied by respective sine coefficients {+1, −1, −1, +1} to generate a sine term. At each sample clock 60 period, the output of the first summing circuit 62A is accumulated by a first accumulator 64A, and the output of the second summing circuit 62B is accumulated by a second accumulator 64B. The accumulators 64A and 64B accumulate the output of the summing circuits 62A and 62B at each sample clock 60 period over a servo burst window corresponding to the servo burst being demodulated. At the end of the servo burst window, the output of the first accumulator 64A is squared 66A, and the output of the second accumulator 64B is squared 66B. The squared values are then summed 68, and the square root 70 of the sum is computed to generate the servo burst signal 58 representing the amplitude of the servo burst.

We claim:
1. A disk drive comprising:
(a) a disk comprising a plurality of tracks, wherein:
  each track comprises a plurality of data sectors and a plurality of servo sectors;
  each servo sector comprises a plurality of servo bursts written using perpendicular magnetic recording;
  each servo burst is written at a servo burst frequency;
  a fill pattern is written between the servo bursts using perpendicular magnetic recording at a frequency substantially equal to an even harmonic of the servo burst frequency; and
  a phase shift occurs in a read signal at the transition between the servo burst and the fill pattern;
(b) a head actuated over the disk for generating the read signal;
(c) a sampling device for sampling the read signal to generate a sequence of read signal sample values; and
(d) control circuitry for demodulating the servo bursts from the sequence of read signal sample values by computing a single-point Discrete Fourier Transform (DFT) at the servo burst frequency.

2. The disk drive as recited in claim 1, wherein the servo bursts are written over the fill pattern.

3. The disk drive as recited in claim 1, wherein the control circuitry computes the single-point DFT by:
(a) summing four of the read signal sample values multiplied by respective cosine coefficients $\{+1, +1, -1, -1\}$ to generate a cosine term;
(b) summing the four read signal sample values multiplied by respective sine coefficients $\{+1, -1, -1, +1\}$ to generate a sine term;
(c) summing a plurality of the cosine terms into a summed cosine term denoted $\Sigma\cos$;
(d) summing a plurality of the sine terms into a summed sine term denoted $\Sigma\sin$; and
(e) computing the square root of $((\Sigma\cos)^2+(\Sigma\sin)^2)$.

4. A method of servo writing servo sectors onto the disk of a disk drive, the disk drive comprising the disk, and a head actuated over the disk, the method comprising the steps of:
(a) using perpendicular magnetic recording to write a fill pattern at a first frequency in a servo burst area of a servo sector; and
(b) using perpendicular magnetic recording to write a plurality of servo bursts over the fill pattern at a servo burst frequency, wherein the first frequency is substantially equal to an even harmonic of the servo burst frequency.

5. The method as recited in claim 4, wherein a phase shift occurs at the transition between the servo burst and the fill pattern.

* * * * *